US012710973B2

(12) United States Patent
Tsirkin et al.

(10) Patent No.: US 12,710,973 B2

(45) Date of Patent: Aug. 18, 2026

(54) EFFICIENTLY MOVING VIRTUAL MACHINES BETWEEN NETWORK HOSTS

(71) Applicant: Red Hat, Inc., Raleigh, NC (US)

(72) Inventors: Michael Tsirkin, Yokneam Illit (IL); David Gilbert, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 709 days.

(21) Appl. No.: 17/851,970

(22) Filed: Jun. 28, 2022

(65) Prior Publication Data

US 2023/0418646 A1 Dec. 28, 2023

(51) Int. Cl.
*G06F 9/455* (2018.01)

(52) U.S. Cl.
CPC ...... *G06F 9/45558* (2013.01); *G06F 9/45545* (2013.01); *G06F 2009/4557* (2013.01); *G06F 2009/45583* (2013.01); *G06F 2009/45595* (2013.01)

(58) Field of Classification Search
CPC .. G06F 9/455; G06F 9/45558; G06F 9/45545; G06F 2009/4557; G06F 2009/45583; G06F 2009/45595
USPC .............................................................. 718/1
See application file for complete search history.

(56) References Cited

U.S. PATENT DOCUMENTS 8,327,060 B2 * 12/2012 Heim .................... G06F 9/4856 711/216
9,110,727 B2 8/2015 Brock et al.
9,116,812 B2 8/2015 Joshi et al.
9,459,902 B2 10/2016 Noel et al.
10,083,062 B2 9/2018 Kuik et al.
2010/0205368 A1 * 8/2010 Gregg ................. G06F 12/0866 711/E12.019
2012/0084445 A1 * 4/2012 Brock ................... G06F 9/5077 709/226

(Continued)

FOREIGN PATENT DOCUMENTS

CN 101466150 B * 10/2010 ............. H04B 1/707
KR 101264895 B1 5/2013

OTHER PUBLICATIONS

Zhang, et al. "Exploiting Data Deduplication to Accelerate Live Virtual Machine Migration." IEEE Xplore, Sep. 20-24, 2010, 3 pages. https://ieeexplore.ieee.org/document/5600319.

(Continued)

*Primary Examiner* — Pierre Vital
*Assistant Examiner* — Daniel Trainor
(74) *Attorney, Agent, or Firm* — Womble Bond Dickinson (US) LLP

(57) ABSTRACT

An example method may include generating a block list comprising a plurality of list items, wherein each list item identifies a respective block of a source virtual machine image, and the list items are ordered in the block list according to a timestamp of each respective block, wherein the timestamp indicates a time of a last access of the respective block, sending the block list to a destination computing device, receiving, from the destination computing device, one or more candidate blocks, determining whether the one or more candidate blocks are included in the source virtual machine image, and sending, to the destination computing device, a result indicating whether the one or more candidate blocks are included in the source virtual machine image.

14 Claims, 7 Drawing Sheets

(56) References Cited

U.S. PATENT DOCUMENTS

| | | | | |
|---|---|---|---|---|
| 2017/0109240 | A1* | 4/2017 | Bezbaruah | G06F 3/067 |
| 2017/0147227 | A1* | 5/2017 | Stabrawa | G06F 3/065 |
| 2017/0277555 | A1* | 9/2017 | Gautam | G06F 16/137 |
| 2018/0285016 | A1* | 10/2018 | Akutsu | G06F 3/06 |

OTHER PUBLICATIONS

Malleswari, et al. "Adaptive deduplication of virtual machine images using AKKA stream to accelerate live migration process in cloud environment." Oct. 2018, 12 pages. https://journalofcloudcomputing.springeropen.com/track/pdf/10.1186/s13677-019-0125-z.pdf.

Zhang, et al. "CBase: Fast Virtual Machine storage data migration with a new data center structure." Sep. 28, 2017, 25 pages. hhttps://www.researchgate.net/publication/328310223_CBase_Fast_Virtual_Machine_storage_data_migration_with_a_new_data_center_structure.

* cited by examiner

Source Computing Device 100

Destination Computing Device 102

Generate a block list comprising a plurality of list items, each item identifying a first block of a source VM image, wherein the block list is sorted in descending order of recency of use 210

Send block list to a destination computing device 212

Receive a copy of the block list 214

Identify, using the block list, one or more first blocks including a most-recently-used block identified by a head list item of the block list 216

Send the one or more first blocks to a destination computing device 218

Receive and store the one or more first blocks in a destination VM image 220

Identify a candidate VM image on destination computing device 222

Identify one or more candidate blocks of the candidate VM image in view of the received block list, the one or more candidate blocks including a second block identified by a tail list item of the block list 224

Send the candidate blocks to the source computing device 226

Receive one or more candidate blocks 228

Identify one or more matching blocks, wherein each of the matching blocks is a received candidate block that matches a corresponding block of the source VM image 230

Send, to the destination computing device, a response identifying the one or more matching blocks 232

Receive the response identifying the one or more matching blocks 234

Copy, to the destination VM image, the one or more matching blocks 236

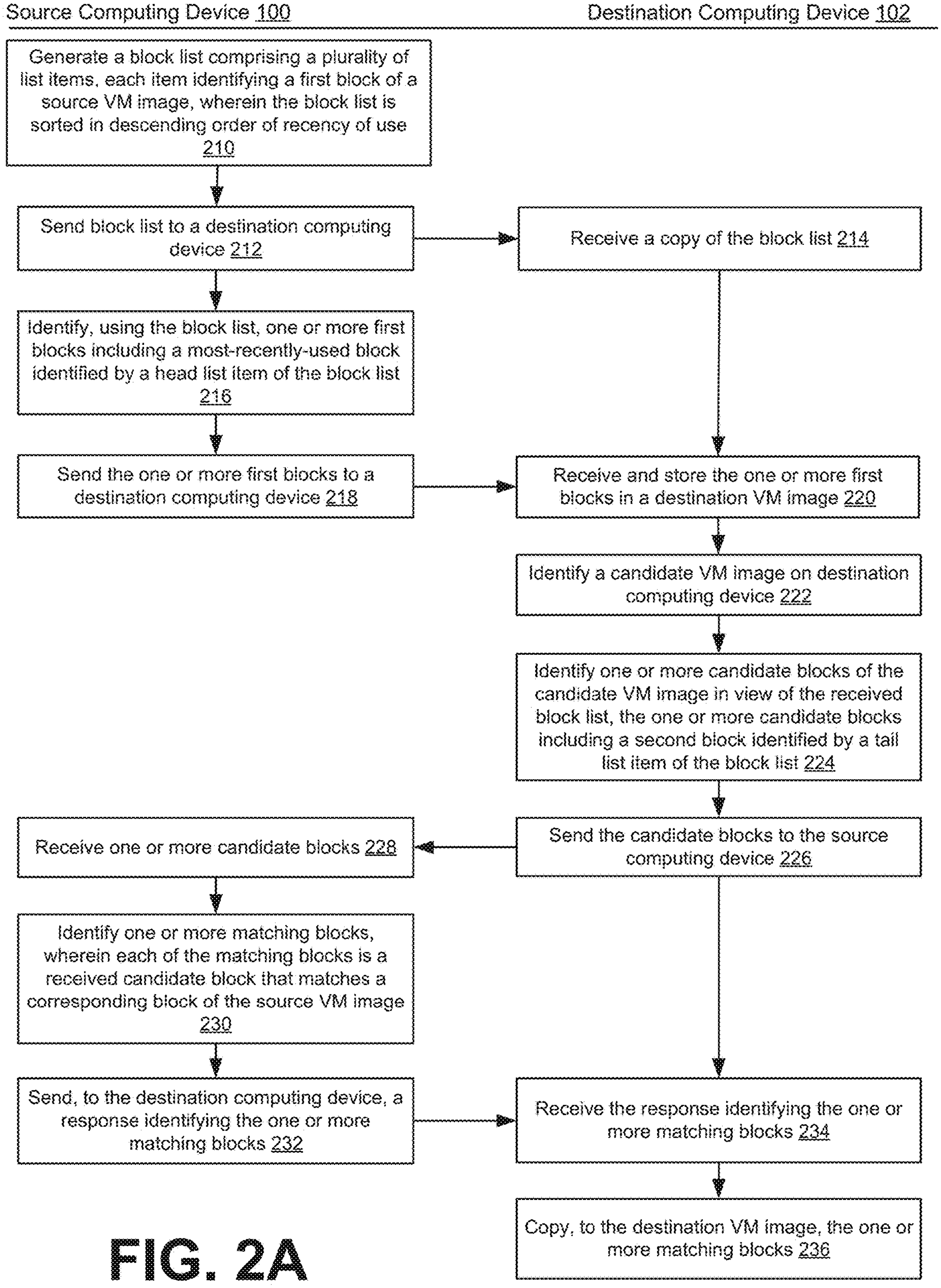

FIG. 2A

Generate a block list comprising a plurality of list items, wherein each list item identifies a respective block of a source virtual machine image, and the list items are ordered in the block list according to a timestamp of each respective block, where the timestamp indicates a time of a last access of the respective block
310

Send the block list to a destination computing device
320

Receive, from the destination computing device, one or more candidate blocks
330

Determine whether the one or more candidate blocks are included in the source virtual machine image
340

Send, to the destination computing device, a result indicating whether the one or more candidate blocks are included in the source virtual machine image
350

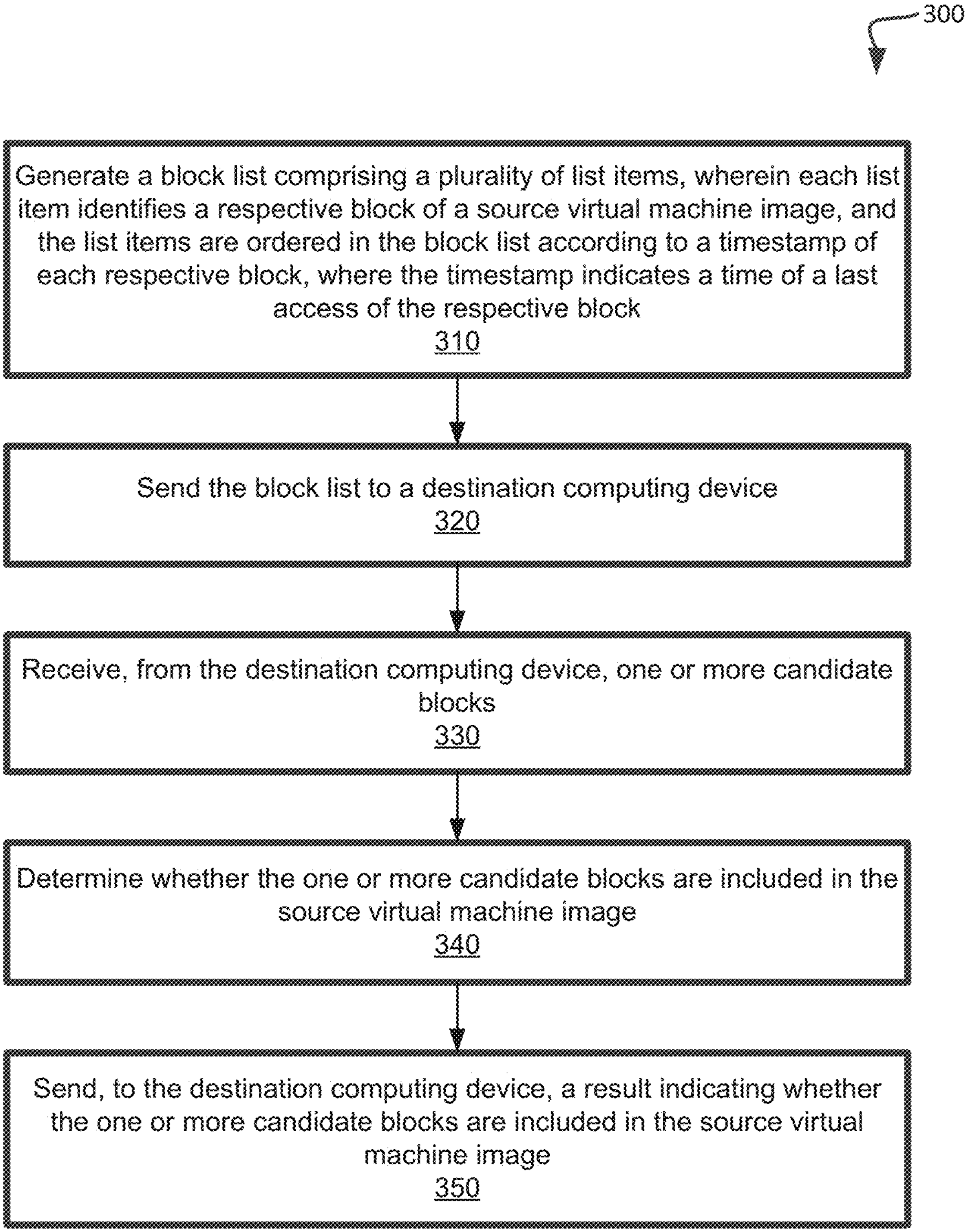

FIG. 3

PROCESSING DEVICE

BLOCK LIST GENERATING MODULE 510

BLOCK LIST SENDING MODULE 515

CANDIDATE BLOCK RECEIVING MODULE 520

CANDIDATE BLOCK DETERMINATION MODULE 530

RESULT SENDING MODULE 540

MEMORY

DATA

EFFICIENTLY MOVING VIRTUAL MACHINES BETWEEN NETWORK HOSTS

TECHNICAL FIELD

The present disclosure is generally related to computer networking, and more particularly, to efficiently moving virtual machines between network hosts.

BACKGROUND

Virtualization allows multiplexing of an underlying host machine between different virtual machines. The host machine allocates a certain amount of its storage resources to each of the virtual machines. Each virtual machine (VM) is then able to use the allocated storage resources to execute applications, including operating systems (referred to as guest operating systems), concurrently and in isolation from other applications on the host machine.

Executable code that provides the virtualization is commonly referred to as a hypervisor (also known as a virtual machine monitor (VMM)). The hypervisor emulates the underlying hardware of the host computer, making the use of the virtual machine transparent to the guest operating system and the user of the computer. The hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device and input/output (I/O) virtualization involves managing the routing of I/O requests between virtual devices and the shared physical hardware.

Each virtual machine has a memory address space in which applications, including operating systems, can execute. The state of a virtual machine, which can include the contents of a virtual machine memory address space, processor registers, and the like, can be stored in a file referred to herein as a "virtual machine image." The virtual machine image thus contains the state of the virtual machine at a particular time. The state of a first virtual machine at a particular time can be saved in an image file, for example. A second virtual machine can subsequently be started from the saved image file, and the second virtual machine can execute using the saved state. Thus, the second virtual machine can resume execution using the state the first virtual machine had at the time the state was saved in the image file.

BRIEF DESCRIPTION OF THE DRAWINGS

The present disclosure is illustrated by way of examples, and not by way of limitation, and may be more fully understood with references to the following detailed description when considered in connection with the figures, in which:

FIGS. 2A and 2B depict interaction diagrams showing an example of moving a virtual machine image between computing devices, in accordance with one or more aspects of the present disclosure;

FIG. 3 depicts a flow diagram of an example method for sending a virtual machine image to a receiving computing device, in accordance with one or more aspects of the present disclosure;

DETAILED DESCRIPTION

Figure 1:
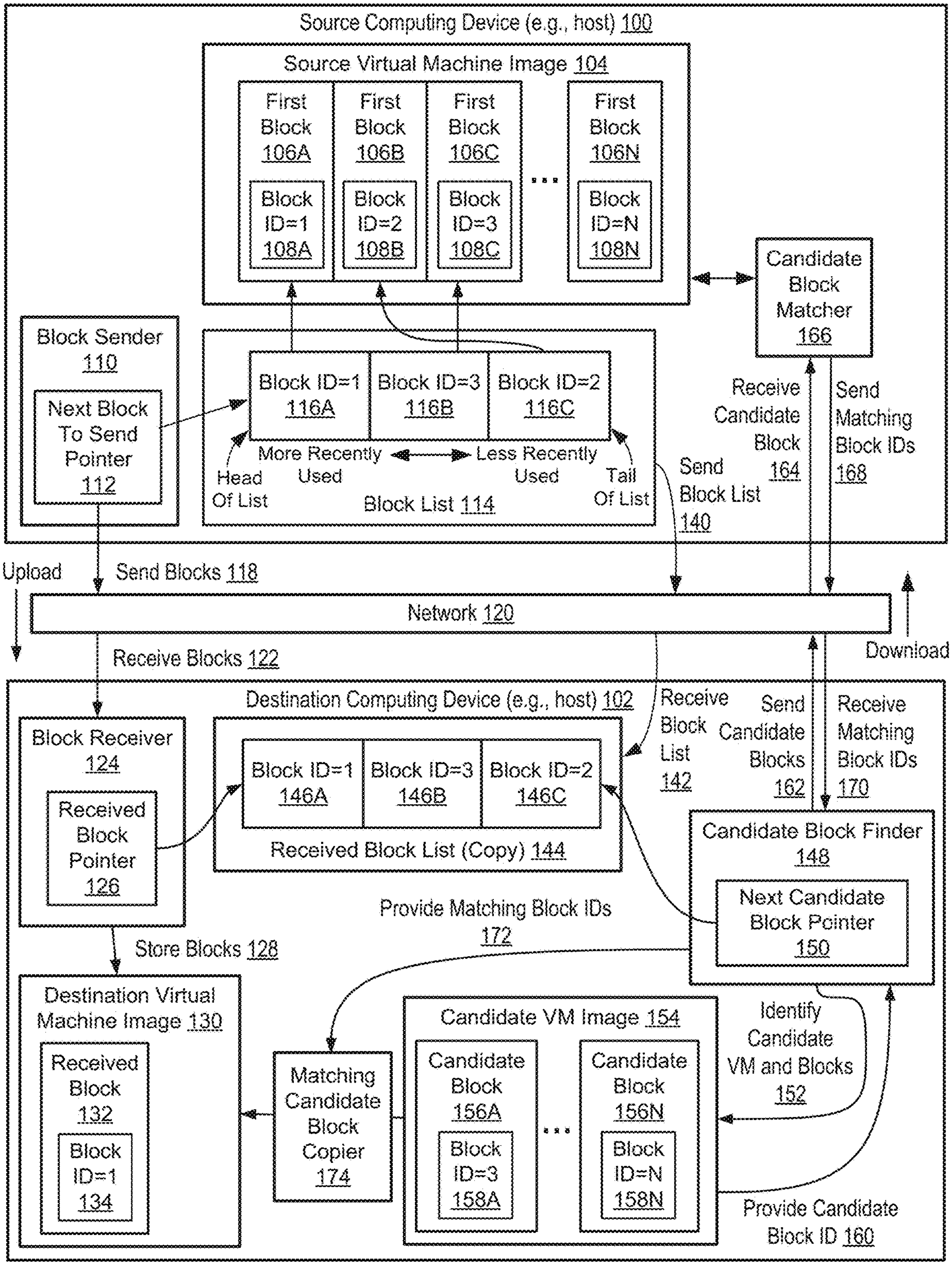
FIG. 1 depicts a high-level block diagram of an example computing system that can efficiently transfer virtual machine images between computing devices, in accordance with one or more aspects of the present disclosure.

Described herein are systems and methods for efficiently moving virtual machines between network hosts. A virtual machine (VM) can be moved from a source host to a destination host when, for example, the source host is to be rebooted, is overloaded by processing or memory demands, or is to be used for different tasks. The hosts can be computing devices that communicate via a computer network, for example. Moving a VM between hosts via a computer network is also known as VM "migration." Moving a VM involves sending the state of the VM's memory, which can include an operating system and applications, and any virtualized devices, to a destination host via a computer network.

A VM can be migrated while it is running, in which case pages of the VM's memory address space can be transferred from the source host to the destination host via the computer network. The VM can then continue running on the destination host using the transferred pages. Alternatively, a VM that is not running can be stored in an image file. The image file can contain the contents of a virtual disk in which the VM's state is stored. The image file can be transferred to the destination host via the computer network, e.g., using a file transfer protocol or network file system, and the VM can be started on the destination host using the transferred image file. A VM can be moved by transferring a set of data units referred to herein as "blocks." The blocks can be any units of data, such as file system blocks, disk blocks, memory blocks, or the like, or portions or fragments thereof. In one example, the blocks can be image file blocks. As another example, if the VM is running, the blocks can correspond to memory pages.

The time it takes to move a VM can depend on network bandwidth and the size of the VM. Since VMs can be quite large in size, e.g., between 20 gigabytes and 160 gigabytes per VM, moving a virtual machine can take a substantial amount of time, and can consume a substantial amount of network bandwidth. For example, importing a VM image into a cloud service can saturate ordinary Internet links and thus take many minutes to complete. The problem of slow VM moves can be exacerbated by asymmetric Internet links such as Asymmetric Digital Subscriber Line (ADSL), in which uplink bandwidth is substantially lower than downlink bandwidth. As another example, within a data center, the time delays involved in moving VMs can limit the ability of the data center to handle time-sensitive operations such as load balancing or events caused by host instability.

Aspects of the present disclosure address the above and other deficiencies by providing a virtual machine (VM) migration system that can improve the efficiency of migrating a "source VM" image from a source host to a destination host via a computer network. To begin migration of a source virtual machine image from the source host to the destination host, the source host can send one or more first blocks of the source virtual machine image to the destination host via a computer network. The destination host can receive each of the blocks and store the received blocks in a destination VM image. To speed up the migration, the destination host can, concurrently with the sending of first blocks described above, identify a local VM image stored at the destination host from which blocks can be copied to the destination VM image, so that the blocks need not be sent via the network from the source host to the destination host. To identify the local VM image, the destination host can, for example, compare one or more of the first blocks that have been received from the source host to corresponding blocks of one or more candidate VM images that are stored locally on the destination host.

The destination host can select one of the candidate VM images, such as a candidate image having at least a threshold number of matching blocks and/or the same image name as the source VM image. Thus, the selected candidate VM image is a local VM image (on the destination host) that at least partially matches the source VM image. The destination host can use the source host to determine whether at least a portion of the selected candidate VM image matches a corresponding portion of the source VM image that has not yet been received by sending one or more "candidate blocks" of the selected candidate VM image to the source host, thereby causing the source host to compare the candidate blocks of the local VM image to corresponding blocks of the of the first VM image located at the source host. The source host can send back to the destination host a result indicating whether the candidate blocks match the corresponding blocks of the first VM image. If the destination host receives a result indicating that the candidate blocks match, then the destination host can copy the candidate blocks from the selected candidate VM image to the destination virtual machine image. Thus, the source host need not send blocks of the source VM image that correspond to the matching candidate blocks.

Referring to the network link from the source host to the destination host as a forward-direction link (e.g., upload link or uplink), and the network link from the destination host to the source host as a reverse-direction link (or downlink), the VM migration system can use network bandwidth in the reverse (e.g., download link or downlink) direction to send one or more candidate blocks from the destination host to the source host, thus allowing the source host to determine whether the candidate blocks match, e.g., have the same data as, corresponding blocks of the source VM image located at the source host. The source host can send an indication of whether each candidate block matches (e.g., has the same data as) the corresponding block of the source virtual machine image on the destination host. A candidate block that matches the corresponding block of the source VM image is referred to herein as a "matching block." The destination host can receive the indication and copy the matching blocks to the second virtual machine image. Since there can be unused bandwidth in the reverse direction, sending the candidate blocks from the destination host to the source host can improve the efficiency of moving the source VM image to the destination host. Since the matching blocks need not be sent in the forward direction, fewer and/or smaller blocks are sent in the forward direction, and the virtual machine image move uses less time and bandwidth than sending the entire source VM image from the source host to the destination host.

The source host can send the first blocks of the source VM image to the destination host via the computer network, and the destination host can copy the first blocks to the destination virtual machine image. The source host can send the first blocks concurrently with the identifying and sending of candidate blocks by the destination host. The first blocks sent by the source host can be, e.g., blocks of the source VM image, and can be sent by the source host in an order of descending recency of access. The source host can generate a list of blocks that the source host expects to send to the destination host, and sort the list of blocks in order of descending recency of use, e.g., from a most recently used block at the head of the list to a least recently used block at the tail of the list. The recency of use of each block can correspond to a timestamp representing a time at which the block was most recently used (e.g., last read or last written). The list of blocks can be, for example, a list of block identifiers. Each entry in the block list corresponds to a block and can be associated with or include the timestamp of the corresponding block.

The source host can send the first blocks specified by the list of blocks in the order that the blocks appear in the list, starting from the head of the list. If the block list is sorted in descending order of their respective timestamps indicating the most recent access time, then starting from the head of the list causes the first blocks to be sent to the destination host in the descending order of recency starting with the most recently accessed block. The first blocks can be selected in descending recency of use since more-recently-used blocks are more likely to change over time than less-recently-used blocks. Thus, more-recently-used blocks are less likely to match blocks in other VM images. Other criteria can be used to select the first blocks in other examples.

To identify the candidate blocks to send to the source host, the destination host can identify a candidate virtual machine image located at the destination host, and select candidate blocks from the candidate virtual machine image. The candidate image can be a VM image located at the destination host and satisfying selection criteria, e.g., having at least a threshold number of matching blocks and/or the same image name as the source VM image. The destination host can use the list of blocks that was generated by the source host to select the candidate blocks from the candidate virtual machine image in order of increasing recency of use, starting with the least-recently-used block in the list of blocks. The destination host can receive the list of blocks from the source host. Thus, the destination host can select the least recently used blocks as the candidate blocks. For example, if the list of blocks is sorted in descending order of recency of use, the last list entry identifies the least recently used block. Thus, to select the least-recently-used block, the destination host can select the list entry at the end of the list. Alternatively or additionally, if each list entry is associated with a timestamp indicating a time at which the corresponding block was most recently used, the destination host can select the least-recently-used block by identifying the list entry associated with the earliest timestamp in the list. Less-recently-used blocks are less likely to change over time and thus more likely to match blocks in other VM images, such as the candidate virtual machine image(s) located at the destination host. Other criteria can be used to select the candidate blocks in other examples.

The destination host can send one or more of the identified candidate blocks to the source host. The source host can compare each received candidate block to a corresponding "second" block of the source VM image, and respond with an indication of whether each candidate block matches the corresponding second block of the source VM image. The corresponding second block can be, e.g., a block of the source VM image having the same block identifier as the candidate block. If the candidate block matches, then the source host can send an indication that the candidate block matches to the destination host, and the destination host can copy the candidate block to the received VM image. Thus, the second block need not be sent via the network.

The systems and methods described herein include technical improvements to virtualization technology. In particular, aspects of the present disclosure may improve the efficiency of moving virtual machines or other data between hosts via a communication network. If the available bandwidth of network communication in the direction from the destination host to the source host (e.g., a download link) is greater than the available bandwidth from the source host to the destination host, then sending blocks from the destination to the source host can have lower latency than sending blocks from the source to the destination host, and the VM migration is sped up by the difference between the time that would be needed to transfer the candidate blocks from the source to the destination host and the time needed to transfer the candidate blocks from the destination to the source host. If the available bandwidth from the destination to the source host is substantially greater than the available bandwidth in the opposite direction (from the source to the destination host), then the VM migration time can be substantially reduced using the techniques disclosed herein.

Using the network bandwidth in the reverse direction (from the destination host to the source host) does not slow the transfer of the first blocks in the "forward" direction (from the source host to the destination host) on networks that provide separate bandwidth in the forward and reverse directions. The bandwidth in the reverse direction is not used to transfer substantial amounts of data by existing VM migration systems and is thus available for use in sending the candidate blocks to the source host. The source host can send a short reply to the destination host indicating whether each candidate block matches a corresponding block of the source VM image. The determination of whether to include the candidate blocks in the received VM image uses a relatively small amount of bandwidth and does not substantially reduce the bandwidth available for transferring the first blocks to the destination host. Thus, the disclosed technique of sending the candidate blocks to the source host, determining matches on the source host, and copying the matching blocks to the destination VM image can reduce the network bandwidth and time needed to transfer the source VM to the destination host.

Various aspects of the above referenced methods and systems are described in details herein below by way of examples, rather than by way of limitation. The examples provided below discuss storage of virtual machines on hosts of a computer network and moving the virtual machines between hosts. The virtual machines are described as being represented by virtual machine images that include blocks of data. In other examples, data other than virtual machines, such as files, can be stored and moved between hosts via a computer network. Further, the virtual machines, files, or other data can include any suitable units of data, such as pages.

FIG. 1 depicts a high-level block diagram of an example computing system that can efficiently transfer virtual machine images 104 between computing devices 100, 102, in accordance with one or more aspects of the present disclosure. A VM migration system can send a source VM image 104 from a source computing device 100 to a destination computing device 102 via a network 120. The source VM image 104 can include the state of a virtual machine, which can include the contents of a virtual machine memory address space, processor registers, and the like. The destination computing device 102 can receive the source VM image 104 and store the received VM image on storage media, e.g., memory or disk storage, as a destination VM image 130. The destination computing device 102 can then run a VM using the VM state from the destination VM image 130.

The source VM image 104 can include a plurality of first blocks 106. For example, first blocks 106A, 106B, 106C, and 106N are shown in FIG. 1. Each of the first blocks 106 can have an associated block ID. For example, first block 106A has Block ID ("1") 108A, first block 106B has Block ID ("2") 108B, first block 106C has block ID ("3") 108C, and first block 106N has block ID ("N") 108N. The source VM image 104 can be, for example, a file, contents of memory of the source computing device 100, or other data format that represents the state of a VM. The blocks can be any suitable units of data, such as fixed-size sequences of bytes, pages, or other units having associated sizes.

A block list 114 can be generated by the VM migration system, e.g., by the block sender 110 or other component on the source computing device 100. The block list 114 can identify one or more of the source VM image blocks 106 ("first blocks") that the source computing device 100 is expected to send to the destination computing device 102. For example, each list item 116 in the block list 114 can identify a block 106 of the source VM image 104. The source computing device 100 can add blocks to the block list 114 in a particular order, so that the items 116 are in that order in the block list 114.

The block sender 110 can use the block list 114 to select the blocks 106 in a particular order, which can be the order in which the blocks are added, the reverse of the order in which the blocks are added, or other suitable order. The order can be, for example, from most recently used to least recently used, which is also referred to herein as descending order of recency of use. Each block and/or list entry identifying a block can be associated with a timestamp specifying a time at which the block was used. For example, the timestamp can specify the time at which the block was most recently accessed. The timestamp can be stored in the list entry or other data structure associated with the block. In other examples, If each list entry is associated with a timestamp, then in response to a block being used, the source computing device can create a list entry for the block being used, set a timestamp associated with the list entry to a current system time, and insert the list entry at an appropriate position in the list so the list remains in sorted order.

As another example, in response to a block being used, e.g., read or written, the source computing device 100 can add the block to the block list 114 without the use of a timestamp, since adding each block when it is used results in a block list sorted by time of use. For example, the source computing device can add each block to the head of the block list 114 in response to the block being used, so that the head list item 116A of the block list 114 references the most recently used block. The second list item 116B references the second most recently used block, and so on, until the tail list item 116C, which references the least recently used block. Thus, list items can be added to block list 114 as blocks are used, so that block list 114 is in a sorted order, such as a descending order of recency of use (from most recently used to least recently used), in which case the list items can be ordered according to a timestamp associated with each list item indicating the last (e.g., most recent) access time of each list item. This order can be used because, for example, the most recently used blocks are more likely to be in a cache at the source computing device 100 than the least recently used blocks.

Further, the least recently used block in the list is at the end of the list. Less recently used blocks can be less likely to change, and thus more likely to be the same across different VM images. The length of the block list 114 can be limited to a particular number of list items, e.g., by deleting the tail list item 116C if the length of the list exceeds the particular number. "Use" of a block herein shall refer to performing a read operation on a block (e.g., recently read), a write operation on a block (e.g., recently modified), or either a read or write operation on a block (e.g., recently read or written).

Although each item 116 of block list 114 specifies a block identifier ("ID") in this example, each list item 116 can alternatively be any suitable information that identifies a block 106. In one example, each block 106 can be a data structure that can be included in the block list 114, in which case each list item of block list 114 can be a block 106. For brevity, each list item of block list 114 can be referred to herein as a block. It should be understood that a list item referred to herein as a "block" can be a data structure that references a block (e.g., a list item 116 can be a data structure that includes a block identifier), or a data structure that includes a block (e.g., a first block 106 can be a data structure that includes a block and a block ID 108).

In the example of FIG. 1, the block list 114 includes three list items 116 in the following order: list item 116A (ID=1), list item 116B (ID=3), and list item 116C (ID=2). List item 116A is at the head of the list 114, and list item 116C is at the tail of the list 114. The list 114 can be sorted in descending order of recency of use, so list item 116A references the most recently used block (block 106A), list item 116B references the second most recently used block (block 106C, used less recently than block 106A), and list item 116C references the third most recently used block (block 108B, used less recently than block 106C. Since list item 116C is at the tail of the list 114, list item 116C identifies the least recently used block 106. Further, the list items 116 can be referred to relative to the least recently used block 116C identified by the tail of the list: the second-to-last list item 116B identifies the second most recently used block 106, and the third-to-last list item 116A identifies the third most recently used block 106.

Although block list 114 is described herein as an ordered list, any suitable data structure that can represent an order of blocks 106 can be used. Thus, in another example, each list item 116 can specify a time or other value indicating when the block identified by the list item was most recently used, and the block list 114 can be sorted by the time or other value. In other example, block list 114 can be implemented as a binary search tree, an array, or other suitable data structure.

It is possible that one or more of the blocks identified by the block list are not subsequently sent, e.g., if the VM migration system may determine that one or more of the blocks are already stored on the destination computing device 102, as described below. Note that block 106N is not included in the block list 114 because, for example, block 106N may have been used less recently than any of the blocks in the list, or may have previously been sent to the destination computing device 102.

As described above, the block list 114 can be in a sorted order, e.g., sorted by recency of use of each block. The block list 114 can be sorted in decreasing order of recency of use, so that the head list item identifies the most recently used block of the blocks identified by the block list, and the tail list item identifies the least recently used block of the blocks identified by the block list. Each list item can be a data structure that identifies a block. Alternatively, each list item can be a block. As an example, the block list can be generated by identifying a predetermined number of the most recently used (e.g., read or written) blocks in the source VM image 104. If the predetermined number is 512, then the most recently used block, the second most recently used block, and the 512th most recently used block can be added to the block list in the order in which they are identified.

List items 116 can be deleted from the block list as their corresponding blocks 106 are sent. For example, each list item 116 can be deleted from the block list after the list item's corresponding block 106 is successfully sent to the destination computing device 102. Subsequently, one or more of the blocks in the block list have been sent and deleted from the block list, additional unsent blocks can be added to the block list in order of recency of use. For example, after the 512 blocks in the block list described above have been sent, the next 512 most recently used unsent blocks can be identified and added to the block list. Alternatively, a most recently used unsent block can be added to the block list each time a block is removed from the block list.

To identify the blocks to send, the block sender 110 can traverse the block list 114 in order, starting from the head of the list 114, which corresponds to block list item 116A in the example of FIG. 1. The example block list 114 contains list item 116A (referencing block 106A), list item 116B (referencing block 106C), and list item 116C (referencing block 106B), so the block sender 110 can send block 106A, block 106C, and block 106B (arrow 118), in that order. However, block list 114 can change over time, and block sender 110 does not necessarily send every block identified by block list 114. The VM migration system can determine that one or more of the blocks identified by the block list 114 are already present at the destination computing device 102, in which case block sender 110 need not send the already-present blocks. For example, if the VM migration system determines that block 106B (having ID=2) is already stored on destination computing device 102, then block sender 110 need not send block 106B.

The VM migration system, upon determining that block 106B is already stored on the destination computing device 102, can update the block list 114 to indicate that block 106B need not be sent. For example, the VM migration system can delete the list item 116C from the block list 114, or can update an attribute of the list item 116B to indicate that block 106B need not be sent. If the VM migration system updates the block list 114 in that way prior to block 106B being sent by block sender 110, then the block sender 110 need not send block 106B, and can proceed to the next list item 116C. Thus, block sender 110 sends the blocks 106 in order of recency of use.

To send blocks 106, the block sender 110 can send the block 106 referenced by the list item 116A at the head of the block list 114, delete the head list item 116A, and repeat by sending the item 116A at the head of the block list 114, until the list is empty. Alternatively or additionally, the block sender 110 can maintain a "next block to send" pointer 112, which references the list item 116 that refers to the next block 106 to be sent. The block sender 110 can update the "next block to send" pointer 112 to reference the next list item 116 in the block list 114 after each block is 106 is sent, until all specified list entries 116 have been processed and the referenced blocks 106 have been sent.

A block receiver 124 on the destination computing device 102 can receive the blocks 106 from the source computing device 100 via the network 120 (arrow 122). The block receiver 124 can store the received blocks in a destination VM image 130 (arrow 128). For example, the first block 106A has been sent to the destination computing device 102 and stored in the destination VM image 130 as a received block 132A.

A candidate block finder 148 executing on the destination computing device 102 can identify a candidate VM image 154 located on the destination computing device 102. The candidate VM image 154 can be, for example, a candidate VM image 154 having the same or similar image name as the source VM image 104, having the most blocks matching corresponding received blocks 132, or having at least a threshold number of blocks matching corresponding received blocks 132, for example. Identifying the candidate VM image 154 is described in further detail with reference to operation 222 of FIG. 2.

The candidate block finder 148 can then identify one or more candidate blocks 156 that are stored in the candidate VM image 154 and have not yet been received from the source computing device 100 (arrow 152). The candidate blocks 156 can be one or more blocks of a candidate VM image 154 that is stored on the destination computing device 102 and may be more likely than other blocks of the candidate VM image 154 to match blocks 106 of the source VM image 104. Any candidate block 156 that matches a block 106 of the source VM image 104 can be copied to the destination VM image 130, so that the matching block 106 need not be sent to the destination computing device 102 via the 120.

The candidate block finder 148 can use a block list copy 144 to identify the candidate blocks 156 on the destination computing device 102. The block list copy 144 can be a copy of the block list 114 sent from the source computing device 100. To identify the candidate blocks 156, the candidate block finder 148 can traverse the block list copy 144 in reverse order, starting from the tail of the list 144, which corresponds to block list item 146C in the example of FIG. 1. The block list 114 can be sent to the destination computing device 102 via the network 120 and stored on the destination computing device 102 (e.g., in memory or other storage) as a block list copy 144. The block list 114 can be sent by the block sender 110 and received by the block receiver 124, or sent and received by other components of the VM migration system, for example.

The block list copy 144 is traversed in reverse order in this example because the tail item 146C of the block list 144 references the least recently used block 106 (of the blocks 106 that are referenced by the list 144). Less recently used blocks can be less likely to change, and thus are more likely to be the same across different VM images, such as the source VM image 104 and a candidate VM image 154. Thus, traversing the list in reverse order starting from the tail 146C identifies the list items 146 in increasing order of recency of use. The reverse traversal identifies the least recently used blocks in the list. The example block list copy 144 contains list item 146A (referencing block 106A), list item 146B (referencing block 106C), and list item 146C (referencing block 106B). List item 146C is at the tail of the list 144, and the list 144 is in decreasing order of recency of access. Thus, tail list item 146C references the least recently used of the blocks referenced by the block list 144.

To identify the candidate blocks 156, the candidate block finder 148 traverses the list 144 in reverse order, starting at the tail, which is list item 146C. Thus, the candidate block finder 148 identifies the candidate blocks 156 having block ID=2, block ID=3, and block ID=1, in that order. Block ID=2 references candidate block 156A. Candidate blocks for block ID=3 and block ID=1 are not shown in FIG. 1.

The identified candidate blocks 156 can be a predetermined number of blocks identified by the block list 144, starting at the tail of the block list 144. The identified candidate blocks 156 can be blocks that have not been received by the block receiver 124, e.g., blocks that have not yet been sent to the destination computing device 102. For example, if the predetermined number is 64, and the 64 blocks identified by the last 64 items of the block list copy 144 have not been received by the destination computing device 102, then the candidate blocks 156 can be the 64 blocks identified by the last 64 items 146 of the block list 144.

The candidate block finder 148 can send the candidate blocks 156 to the source computing device 100 for comparison to first blocks 106 of the source VM image 104 (arrow 162). To send candidate blocks 156, the candidate block finder 148 can send the candidate block 156 referenced by the list item 116A at the head of the block list 114, delete the head list item 116A, and repeat by sending the item 116A at the head of the block list 114, until the list is empty.

Alternatively or additionally, the candidate block finder 148 can maintain a "next candidate block to send" pointer 150, which references the list item 146 that refers to the next candidate block 156 to be sent. Since the block list 144 is traversed in reverse order, the next block to send is identified by the predecessor list item 146 (e.g., list item 146B) of the current list item 146 (e.g., list item 146C). The candidate block finder 148 can thus update the "next candidate block to send" pointer 150 to reference the predecessor list item 146 in the block list 144 after each block 146 is sent, until all specified list entries 146 have been processed and the referenced candidate blocks 156 have been sent.

The references from list items 146 to candidate blocks 156 are specified by block IDs in the example of FIG. 1. For example, block list item 146C specifies block ID=2, which references candidate block 156A. Block ID=2 also references first block 106B, which is located on the source computing device 100. Thus, there is a correspondence between candidate block 156A and first block 106B established by the block ID. However, candidate block 156A is not necessarily the same as first block 106B. Thus, the candidate block finder 148 sends candidate block 156A to the source computing device 100, which can determine whether candidate block 156A is the same as first block 106B. Although block IDs are used to identify the block 106 that corresponds to a particular candidate block 156 in the examples described here, any suitable relation can be used to identify the block 106 that corresponds to a particular candidate block 156. For example, the position in the candidate VM image 154 of the candidate block 156 (e.g., the 100th block from the beginning of the candidate VM image 154) can be used to identify a corresponding first block 106 of the source VM image 104 (e.g., the 100th block from the beginning of the source VM image 104).

The source computing device 100 can receive the candidate block(s) from the destination computing device 102 (arrow 164). A candidate block verifier 166 can compare each of the received candidate blocks (not shown) to a corresponding one of the first blocks 106. For example, a received candidate block having block ID=2 can be compared to a first block 106B having the same block ID=2. Blocks can be compared by, for example, comparing the data included in each of the blocks. If the data included in each of the blocks is the same (e.g., is the same sequence of byte values), then the blocks match. In other examples, other information can be used to establish the correlation between candidate block 156 and first block 106, as described above.

The candidate block verifier 166 can send the block ID of each candidate block 156 that matches a corresponding first block 106 to the destination computing device 102 (arrow 168). The candidate block finder 148 on the destination computing device 102 can receive each block ID of a matching block (arrow 170). The candidate block finder 148 can provide each of the received block IDs of matching blocks to a matching block copier 174 (arrow 172). For each of the received block IDs, the matching block copier 174 can copy the candidate block 156 identified by the received block ID to the destination VM image 130. For example, if the received block IDs include a block ID=2, then the matching block copier 174 can copy candidate block 156A to the destination VM image 130. The result of copying Candidate block 156A is shown as a received block 132B in the destination VM image 130.

In response to receiving and/or storing a received block 132, the block receiver 124 can update the block list copy 144 to indicate that that the block 132 has been received. Blocks that have been received need not be sent to the source computing device 100 by candidate block finder 148. In one example, the block receiver 124 can delete the list item 146 that has the same block ID as the received block 132 from the block list copy 144. In another example, the block receiver 124 can set an attribute of the list item 146, e.g., a Boolean value associated with or stored in the list item 146, to indicate that the block referenced by the list item 146 has been received. The candidate block finder 148 can then determine whether to send a candidate block to the source computing device 100 based on the attribute of the list item that references the candidate block (e.g., has the same ID as the candidate block). If the attribute indicates that the candidate block has been received and/or stored, then the candidate block finder 148 need not send the candidate block to the source computing device 100.

Figure 2B:
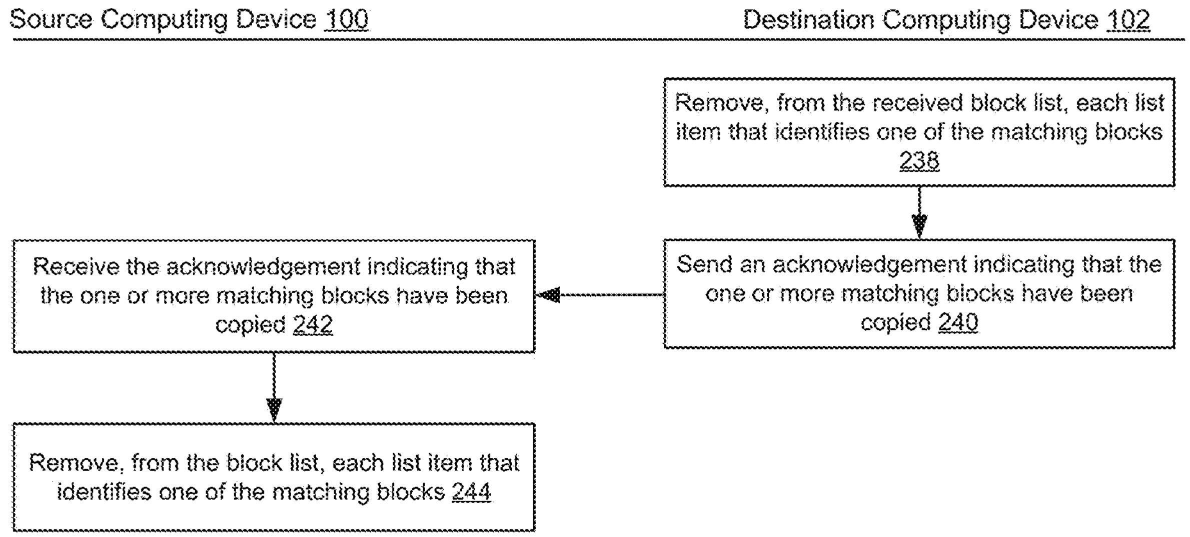

FIGS. 2A and 2B depict interaction diagrams showing an example of moving a virtual machine image between computing devices, in accordance with one or more aspects of the present disclosure. The operations shown in FIGS. 2A and 2B can be performed by, for example, program code instructions that implement components of a VM migration system. Components of the VM migration system, such as block sender 110 and candidate block verifier 166, can execute on source computing device 100. Other components of the VM migration system, such as block receiver 124, candidate block finder 148, and matching block copier 174, can execute on destination computing device 102.

The VM migration system can move a source VM image 104 from the source computing device 100 to the destination computing device 102 by performing a first transfer of first blocks 106 of the source VM image 104 to the destination computing device 102 and, while the first transfer is being performed, also performing a second transfer of one or more candidate blocks 156 from the destination computing device 102 to the source computing device 100. The first transfer can be in a first direction (e.g., via an uplink) and can include network data sending operations performed by the source computing device 100 as described below, such as sending the first blocks 106 to the destination computing device 102 (operation 218). The first transfer can also include network data receiving operations performed by the destination computing device 102 as described below, such as receiving and storing the first blocks 106 in a destination VM image 130.

The second transfer can be in a second direction that is the reverse of the first direction (e.g., via a downlink) and can include network data sending operations performed by the destination computing device 102, such as sending the candidate blocks 156 to the source computing device 100 (operation 226). The second transfer can also include network data receiving operations performed by the source computing device 100, such as receiving the candidate blocks 156 (operation 228). Further, the first transfer can also include one or more additional operations performed by the source computing device 100, such as one or more of the operations described below as being performed by the source computing device 100. The second transfer can also include one or more additional operations performed by the destination computing device 102, such as one or more of the operations described below as being performed by the destination computing device 102.

As shown in FIG. 2A, at operation 210, the source computing device 100 can generate a block list 114. The block list 114 includes one or more list items, and each list item identifies at least one first block 106 of a source VM image 104. As described above with respect to FIG. 1, the block list 114 can identify one or more of the source VM image blocks 106 that the source computing device 100 is expected to send to the destination computing device 102.

At operation 212, the source computing device 100 can send the block list 114 to the destination computing device 102 via the network 120. At operation 214, the destination computing device 102 can receive a copy 144 of the block list. The destination computing device 102 can use the block list copy 144 to identify candidate blocks, as described below.

At operation 214, the source computing device 100 can identify, using the block list, one or more first blocks 106 to be sent to the destination computing device 102. The first blocks 106 can be identified starting at the head list item of the block list 114, so that the first blocks 106 include the most recently used block in the block list (which is the head list item of the block list). The identified first blocks 106 can be a predetermined number of blocks identified by the block list 114, starting at the head of the block list. The identified blocks can be unsent blocks, e.g., blocks that have not yet been sent to the destination computing device 102. For example, if the predetermined number is 128, and none of the blocks in the block list 114 have been sent to the destination computing device 102, then the identified first blocks can be the 128 blocks identified by the first 128 items 116 of the block list 114.

At operation 218, the source computing device 100 can send the identified first blocks 106 to the destination computing device 102. A "next block to send" pointer 112 can reference a list item 116 that references the next block 106 to be sent. The pointer 112 can thus be used to identify each first block 106 to send. After each block 106 is sent, the pointer 112 can be updated to reference the next list item 116 in the block list 114. In one example, after each block 106 is sent, a "sent" attribute associated with the block 106 or associated with the corresponding list item 116 can be updated to indicate that the block 106 has been sent. The "sent" attribute can be subsequently used to exclude previously-sent blocks from the block list 114 (e.g., when the block list is generated).

At operation 220, the destination computing device 102 can receive the blocks 106 as received blocks 132 and store each of the received blocks 132 in a destination VM image 130. Each received block 132 can include or be associated with a block ID, such as the block ID 108 from the source computing device 100. For example, the destination computing device 102 can receive the first block 106A and store the received copy of the first block 106A in the destination VM image 130 as a received block 132A having the same block ID ("1") as the first block 106A.

In response to receiving and/or storing a received block 132, operation 220 can update the block list copy 144 to indicate that that the block 132 has been received. In one example, operation 220 can delete the list item 146 that has the same block ID as the received block 132 from the block list copy 144.

At operation 222, the destination computing device 102 can identify a candidate VM image on the destination computing device 102. The candidate VM image can be, for example, a VM image stored on the destination computing device 102 and satisfying selection criteria, e.g., having the same or similar image name as the source VM image 104, having the most blocks matching corresponding received blocks 132, and/or having at least a threshold number of blocks matching corresponding received blocks 132, for example. In one example, the destination computing device 102 can identify a candidate VM image 154 having the same or similar image name as the source VM image 104. The destination computing device 102 can receive the image name of the source VM image 104 from the source computing device 100, e.g., in one of the received blocks 132, as metadata sent with one of the received block 132, or in a message that is separate from the received blocks 132. If the source VM image 104 has the image name "rhe1.img", then the identified candidate virtual image name can also be "rhe1.img". The destination computing device 102 can search the file system or a locally accessible database for a VM image having the image name "rhe1.img". If such a VM image is found, it can be used as the candidate VM image 154. If a VM image having the same image name is not found, then the destination computing device 102 can search for a VM image having a similar image name, e.g., "rhe151.img". If a VM having a similar image name is found, it can be used as the candidate VM image 154. In another example, an image tenant name associated with the source VM image 104 can be used to identify a candidate VM image 154.

In another example, at operation 222, the destination computing device 102 can identify a candidate VM image 154 having the most blocks matching corresponding received blocks 132 of the source VM image 104. The candidate VM image 154 having the most blocks matching can be, for example, the candidate VM image 154 having the greatest number of blocks of any image in a set of images. The set of images can be, for example, two or more virtual machine images that are stored locally at the destination computing device 102. The identified candidate VM image 154 can be the image in the set having more blocks that match respective received blocks 132 of the source VM image 104 than each of the other images in the set. The respective blocks can be, e.g., blocks of a candidate VM image 154 having the same block ID as received blocks 132. Matching blocks can be blocks having the same block ID and the same data. Blocks having the same data can be identified by comparing each byte of data in the blocks, and/or by comparing checksums, hashes, or the like of the blocks. In another example, the destination computing device 102 can identify a candidate VM image 154 having at least a threshold number of blocks matching corresponding received blocks 132.

In another example, the destination computing device 102 can identify a candidate VM image 154 having the most blocks (e.g., of any image in a set of images) matching corresponding received blocks 132 of the source VM image 104, up to a threshold number of blocks. The comparison can begin, for example, at the first received block 132 of the destination VM image 130. The threshold number of blocks can be, for example, 1, 100, 1000, or other suitable number of blocks. For example, if the threshold is 2000 blocks, then after comparing 2000 received blocks 132 to corresponding candidate blocks 156 of two candidate VM images 154, the destination computing device 102 (e.g., the candidate block finder 148, as shown by arrow 152) determines that a first candidate VM image 154 has 1200 blocks matching corresponding received blocks 132, and a second candidate VM image 154 has 1400 blocks matching corresponding received blocks 132, then the second candidate VM image 154 is selected as the identified candidate VM image 154 because the second candidate VM image 154 has more matching blocks than the first candidate VM image 154.

At operation 224, the destination computing device 102 can identify one or more candidate blocks 156 of the candidate VM image 154. In one example, the candidate blocks 156 identified at operation 224 can be blocks of the candidate VM image 154 that have not yet been received from the source computing device 100. Each candidate block 156 can be identified based on the block list copy 144. The candidate blocks 156 can be selected from the end of the block list copy 144. Thus, the candidate blocks 156 include the block identified by the tail list item 145C of the block list copy 144, and one or more of the more recently used blocks that are identified by traversing the list in order from tail to head. For example, the candidate blocks 156 can be a predetermined number N of the least recently used blocks identified by the block list copy 144. The candidate blocks 156 can thus be the last N list entries of the block list copy 144, ordered starting at the end of the block list copy 144. As an example, if the block list copy 144 contains the block IDs 1, 3, and 2, in that order, and N is 2, then the IDs of the candidate blocks are 2 and 3, in that order.

In another example, at operation 224, the destination computing device 102 can identify candidate blocks 156 by comparing two (or more) VM images that are located at the destination computing device 102 and selecting matching blocks, e.g., blocks that have the same data in both images. The matching blocks can also be blocks that have the same block ID and data in both images. In one example, operation 224 can determine whether to send a candidate block to the source computing device 100 based on an attribute of the list item that references the candidate block (e.g., has the same ID as the candidate block). If the attribute indicates that the candidate block has been received and/or stored at the destination computing device 102, then operation 224 need not send the candidate block to the source computing device 100.

At operation 226, the destination computing device 102 can send one or more of the identified candidate blocks 156 to the source computing device 100 via network 120. The block ID and data of each candidate block 156 can be sent to the source computing device 100. In one example, data sent to the source computing device 100 can be sent via a downlink (e.g., downloaded).

At operation 228, the source computing device 100 can receive the one or more candidate blocks 156 from the destination computing device 102. At operation 230, the source computing device 100 can identify one or more matching blocks, each of which can be a block 106 of the source VM image 104 that matches a respective one of the received candidate blocks 156. At operation 232, the source computing device 100 can send, to the destination computing device 102, a response identifying one or more of the matching blocks.

For example, if there are two received candidate blocks having block ID=2 and block ID=3, respectively, then operation 230 can compare the data of the candidate block having block ID=2 to the block of the source VM image 104 having block ID=2, which is the first block 106B. If the data matches (e.g., the data in each of the blocks being compared has the same sequence of byte values), then at operation 232 the destination computing device 102 can send the block ID of the matching block to the destination computing device 102.

As an example, suppose that the data of the first block 106B (which has ID=2) matches the received candidate block having ID=2. In that case, the block ID value 2 is sent to the destination computing device 102. Further, suppose that the data of the first block 106C (which has ID=3) does not match the received candidate block having ID=3. In that case, the block ID value 3 is not sent to the destination computing device 102. Although block ID values are used to identify respective blocks in the examples described herein, any suitable correlation technique can be used to identify the respective blocks, such as positions of the blocks in the images, a data structure that can be used to efficiently search for matching blocks (e.g., an index of hash values of the data of blocks), and so on.

At operation 234, the destination computing device 102 can receive the response identifying the one or more matching blocks. At operation 236, the destination computing device 102 can copy, to the destination VM image 130, the one or more matching blocks. As an example, if the response specifies block ID=2, then operation 236 can copy Candidate block 156A, which has ID=2, from the candidate VM image 154 to the destination VM image 130. The resulting copied block is shown in the destination VM image 130 as received block 132B.

The destination computing device 102 can execute operation 238, which is shown in FIG. 2B, subsequent to operation 236. At operation 238, the destination computing device 102 can remove, from the received block list, each list item that identifies one of the matching blocks. As an example, suppose the matching block ID is 2. In that case, operation 238 can remove list item 146C, which references block ID=2, from the block list copy 144. Thus, block ID 2 is not subsequently identified as a candidate block 156 for the destination VM image 130. At operation 240, the destination computing device 102 can send an acknowledgement specifying the matching block IDs to the source computing device 100. The acknowledgement indicates that the one or more matching blocks have been copied to the destination VM image 130, and thus need not be sent by the source computing device 100. At operation 242, the source computing device 100 can receive the acknowledgement. At operation 244, the source computing device 100 can remove, from the block list 114, each list item 116 that identifies one of the matching blocks. For example, for each block identifier specified in the acknowledgement, the destination computing device 102 can remove the list item specifying the block identifier from the block list 114.

FIG. 3 depicts a flow diagram of an example method 300 for sending a virtual machine image to a receiving computing device, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a computing device 100 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 300 may be performed by processing devices of a server device or a client device and may begin at block 310. At block 310, a computing device 100 may generate a block list comprising a plurality of list items, where each list item identifies a respective block of a source virtual machine image, and the list items are ordered in the block list according to a timestamp of each respective block, where the timestamp indicates a time of a last access of the respective block. Thus, the list items can be ordered in the block list according to recency of use of each respective block. For example, the list items can be sorted in decreasing order of recency of use of each respective block, where a first item at a head of the list identifies a most recently used block of the source virtual machine image, and a second item at a tail of the list identifies a least recently used block of the source virtual machine image.

At block 320, the computing device 100 may send the block list to a destination computing device. At block 330, the computing device 100 may receive, from the destination computing device, one or more candidate blocks. At block 340, the computing device 100 may determine whether the one or more candidate blocks are included in the source virtual machine image. For example, to make the determination, block 340 may identify one or more matching blocks, wherein the one or more matching blocks include each of the received candidate blocks that matches a respective block of the source virtual machine image. To identify the machine blocks, block 340 may identify, for each received candidate block, the respective block of the source virtual machine image, and compare data stored in each received candidate block to data stored in the respective block of the source virtual machine image. The matching blocks can include the received candidate block if the data stored in the respective block of the source virtual machine image matches the data stored in the received candidate block. At block 350, the computing device 100 may send, to the destination computing device, a result indicating whether the one or more candidate blocks are included in the source virtual machine image. Responsive to completing the operations described herein above with reference to block 350, the method may terminate.

Figure 4:
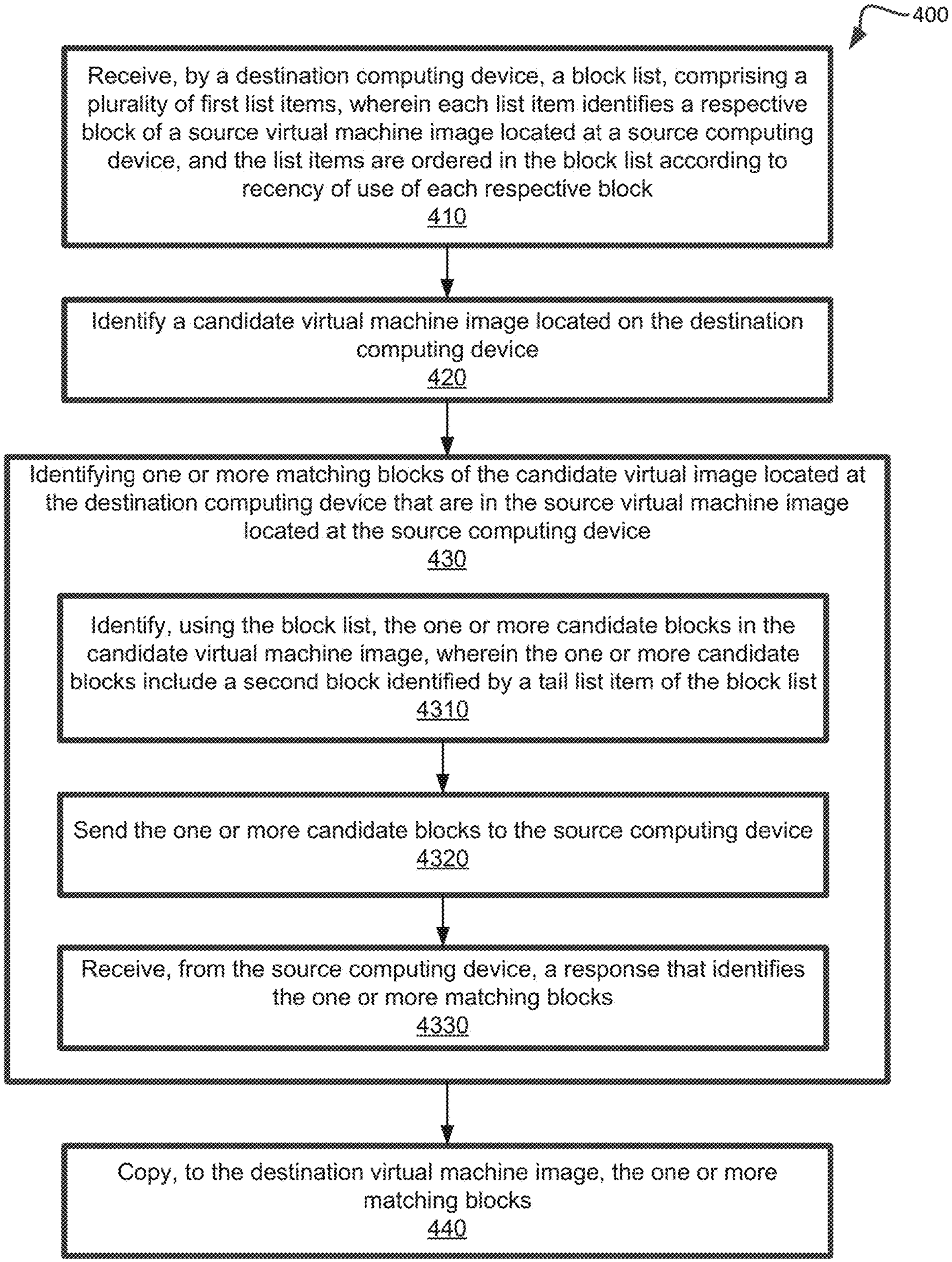
FIG. 4 depicts a flow diagram of an example method for receiving a virtual machine image from a sending computing device, in accordance with one or more aspects of the present disclosure.

FIG. 4 depicts a flow diagram of an example method 400 for receiving a virtual machine image from a sending computing device, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by a computing device 102 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 400 may be performed by processing devices of a server device or a client device and may begin at block 410. At block 410, a computing device 102 may receive, by a destination computing device, a block list, comprising a plurality of list items, wherein each list item identifies a respective block of a source VM image located at a source computing device, and the list items are ordered in the block list according to recency of use of each respective block.

At block 420, the computing device 102 may identify a candidate virtual machine image located on the destination computing device. The candidate VM image 154 can be, for example, a candidate VM image 154 having the same or similar image name as the source VM image 104, having the most blocks matching corresponding received blocks 132, or having at least a threshold number of blocks matching corresponding received blocks 132, for example. Identifying the candidate VM image 154 is described in further detail with reference to operation 222 of FIG. 2.

At block 430, the computing device 102 may identify one or more matching blocks of the candidate virtual image located at the destination computing device that are in the source VM image located at the source computing device. Further, at block 430, the computing device 102 may perform blocks 4310, 4320, and 4330. At block 4310, the computing device 102 may identify, using the block list, the one or more candidate blocks in the candidate virtual machine image, wherein the one or more candidate blocks include a second block identified by a tail list item of the block list. At block 4320, the computing device 102 may send the one or more candidate blocks to the source computing device. At block 4330, the computing device 102 may receive, from the source computing device, a response that identifies the one or more matching blocks. At block 440, the computing device 102 may copy, to the destination virtual machine image, the one or more matching blocks. Responsive to completing the operations described herein above with reference to block 440, the method may terminate.

Figure 5:
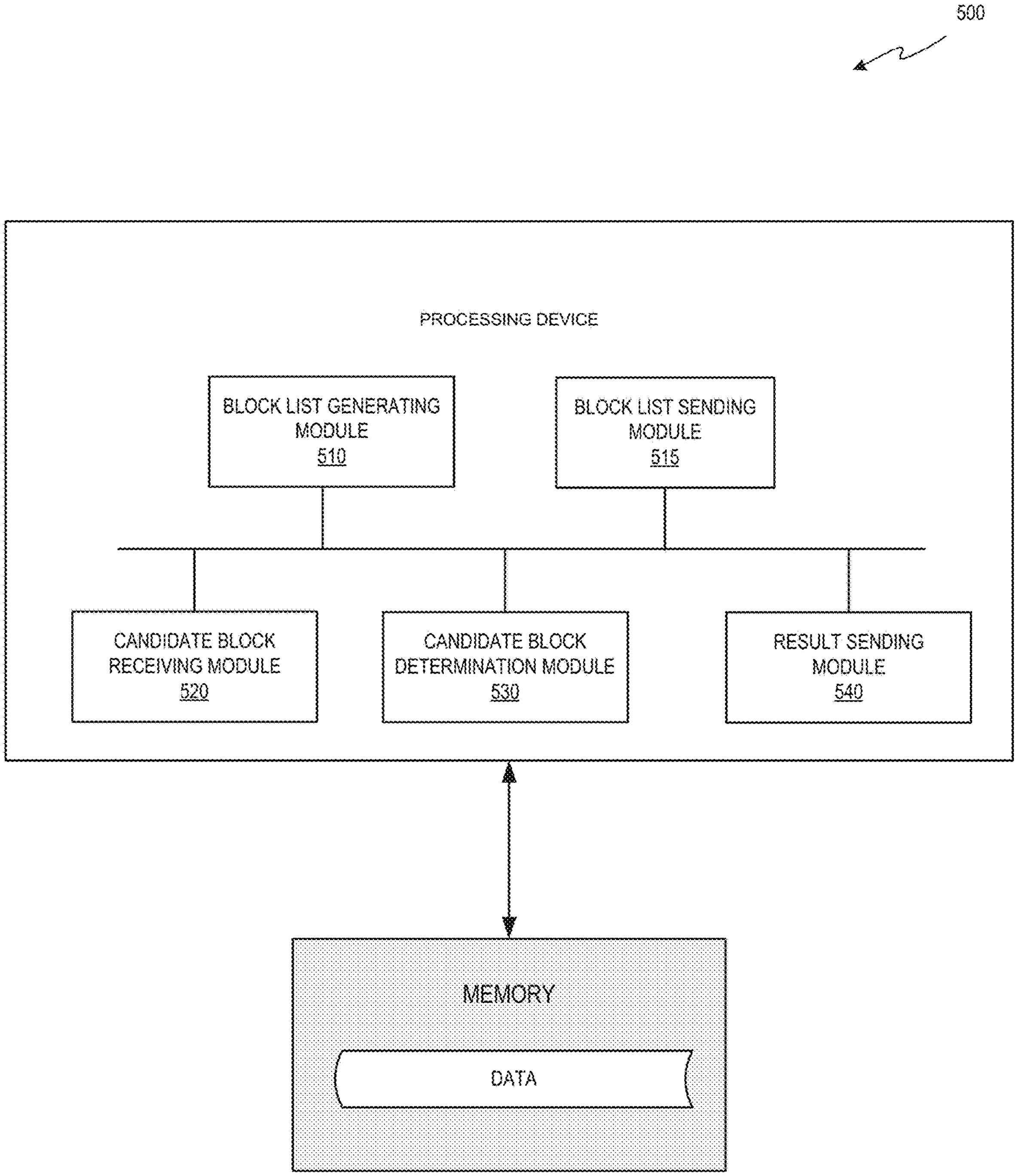
FIG. 5 depicts a block diagram of an example computer system in accordance with one or more aspects of the present disclosure.

FIG. 5 depicts a block diagram of a computer system 500 operating in accordance with one or more aspects of the present disclosure. Computer system 500 may be the same or similar to source computing device 100 and/or destination computing device 102 of FIG. 1, and may include one or more processors and one or more memory devices. In the example shown, computer system 500 may include a block list generating module 510, a block list sending module 515, a candidate block determination module 520, and a result sending module 530.

Block list generating module 510 may enable a processor to generate a block list comprising a plurality of list items, where each list item identifies a respective block of a source virtual machine image located at the source computing device. The list items can be ordered in the block list according to recency of use of each respective block. For example, the list items can be ordered in the block list according to a timestamp of each respective block, where the timestamp indicates a time of a last access of the respective block. In another example, the list items can be sorted in decreasing order of recency of use of each respective block, where a first item at a head of the list identifies a most recently used block of the source virtual machine image, and a second item at a tail of the list identifies a least recently used block of the source virtual machine image.

Block list sending module 515 may enable the processor to send the block list to a destination computing device. Candidate block receiving module 520 may enable the processor to receive, from the destination computing device, one or more candidate blocks. Candidate block determination module 530 may enable the processor to determine whether the one or more received candidate blocks are included in the source virtual machine image. Candidate block determination module 530 may, as an example, enable the processor to identify one or more matching blocks, where the one or more matching blocks include each of the received candidate blocks that matches a respective block of the source virtual machine image.

Result sending module 540 may enable the processor to send, to the destination computing device, a result indicating whether the one or more candidate blocks are included in the source virtual machine image. Result sending module 540 may, as an example, enable the processor to send, to the destination computing device, a response that identifies the one or more matching blocks.

Figure 6:
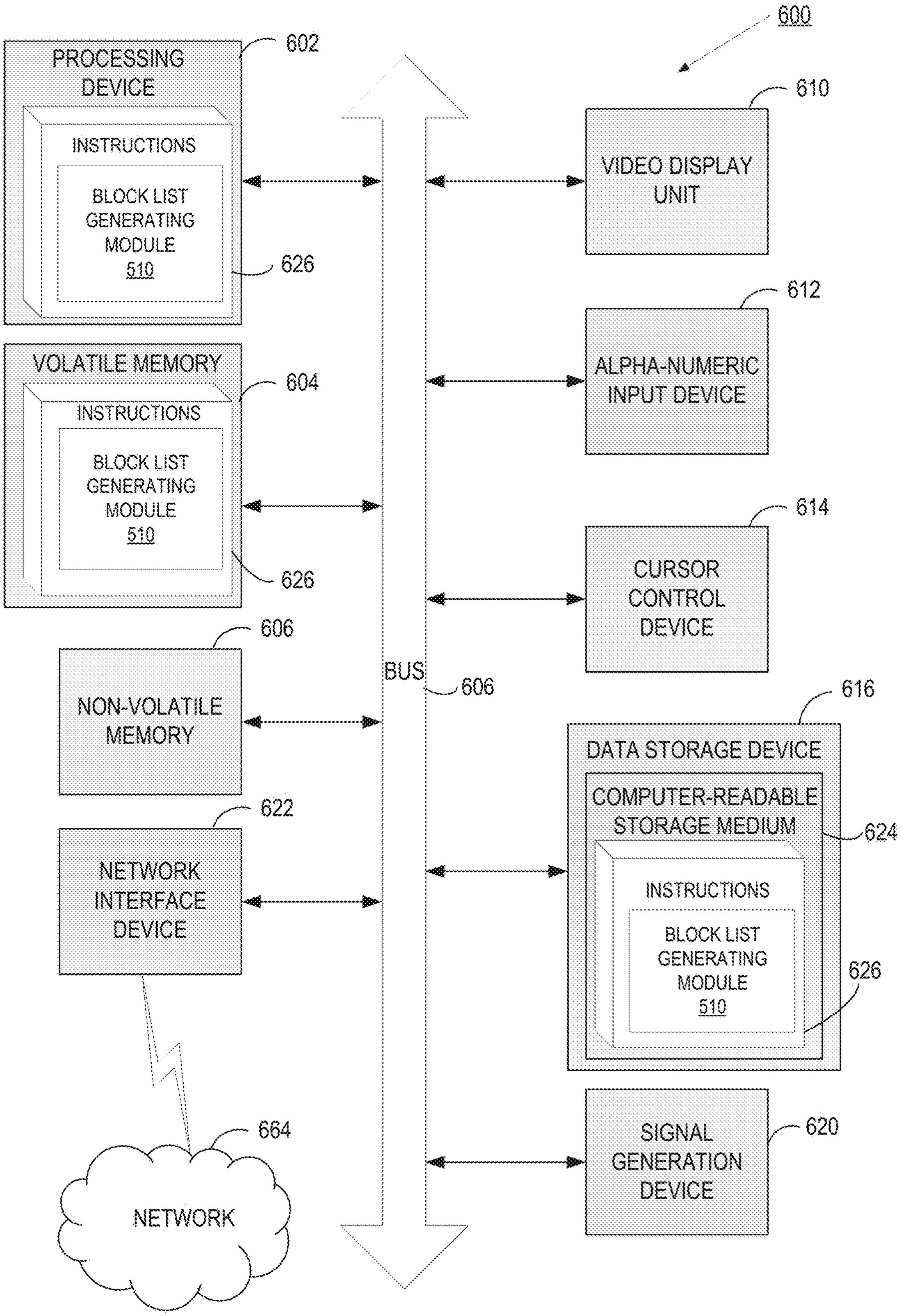
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to computer system 100 of FIG. 1. Computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing method 400 or 500.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 400 or 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

generating, by a source computing device, a block list comprising a plurality of list items, wherein each list item identifies a respective block of a source virtual machine image corresponding to a state of a first virtual machine, and the list items are ordered in the block list according to a timestamp of each respective block, wherein the timestamp indicates a time of a last access of the respective block;

deleting a list item from the block list based on a length of the block list exceeding a limit;

sending the block list to a destination computing device;

sending, to the destination computing device, a first block as referenced by a first list item;

deleting the first list item from the block list;

emptying the block list;

receiving, from the destination computing device, one or more candidate blocks;

determining whether the one or more candidate blocks are included in the source virtual machine image by identifying the one or more matching blocks, wherein the one or more matching blocks include each of the candidate blocks that matches a respective block of the source virtual machine image;

sending, to the destination computing device, a result indicating one or more matching blocks among the one or more candidate blocks that are included in the source virtual machine image;

sending, to the destination computing device, the source virtual machine image excluding the one or more matching blocks; and causing the first virtual machine to migrate from the source computing device to the destination computing device such that a second virtual machine starts to execute on the destination computing device using the state of the first virtual machine.

2. The method of claim 1, wherein identifying the one or more matching blocks comprises:

identifying, for each received candidate block, the respective block of the source virtual machine image; and comparing data stored in each received candidate block to data stored in the respective block of the source virtual machine image, wherein the one or more matching blocks include the received candidate block if the data stored in the respective block of the source virtual machine image matches the data stored in the received candidate block.

3. The method of claim 2, wherein each of the one or more candidate blocks is associated with a respective block identifier, and identifying the respective block of the source virtual machine image comprises searching the source virtual machine image for a block associated with the respective block identifier.

4. The method of claim 1, further comprising:

receiving, from the destination computing device, an indication that the one or more matching blocks have been copied; and responsive to receiving the indication, removing, from the block list, each list item that identifies one of the one or more matching blocks.

5. The method of claim 1, wherein the list items are sorted in decreasing order of recency of use of each respective block, wherein a first item at a head of the block list identifies a most recently used block of the source virtual machine image, and a second item at a tail of the block list identifies a least recently used block of the source virtual machine image.

6. The method of claim 1, further comprising:

identifying, using the block list, one or more first blocks including a most-recently-used block; and sending the one or more first blocks to the destination computing device.

7. The method of claim 6, wherein determining whether that one or more candidate blocks located on the destination computing device are included in the source virtual machine image is performed concurrently with sending the one or more first blocks to the destination computing device.

8. The method of claim 6, wherein the one or more first blocks are sent in order of decreasing recency of use.

9. The method of claim 6, wherein the one or more first blocks are sent to the destination computing device via a network uplink, and the one or more candidate blocks are received from the destination computing device via a network downlink having greater bandwidth than the network uplink.

10. The method of claim 6, further comprising:

transmitting, to the destination computing device, the one or more first blocks from the source computing device; and causing the destination computing device to store the one or more first blocks in a destination virtual machine image.

11. The method of claim 1, further comprising:

causing the destination computing device to copy the one or more matching blocks to a destination virtual machine image.

12. The method of claim 11, further comprising:

receiving, from the destination computing device, an indication that the one or more matching blocks have been copied.

13. A system comprising:

a memory device; and a processing device, operatively coupled to the memory device, to:

generate a block list comprising a plurality of list items, wherein each list item identifies a respective block of a source virtual machine image corresponding to a state of a first virtual machine, and the list items are ordered in the block list according to a timestamp of each respective block, wherein the timestamp indicates a time of a last access of the respective block;

delete a list item from the block list based on a length of the block list exceeding a limit;

send the block list to a destination computing device;

send, to the destination computing device, a first block as referenced by a first list item;

delete the first list item from the block list;

empty the block list;

receive, from the destination computing device, one or more candidate blocks; determine whether the one or more candidate blocks are included in the source virtual machine image by identifying the one or more matching blocks, wherein the one or more matching blocks include each of the candidate blocks that matches a respective block of the source virtual machine image;

send, to the destination computing device, a result indicating one or more matching blocks among the one or more candidate blocks that are included in the source virtual machine image;

send, to the destination computing device, the source virtual machine image excluding the one or more matching blocks; and cause the first virtual machine to migrate from the source computing device to the destination computing device such that a second virtual machine starts to execute on the destination computing device using the state of the first virtual machine.

14. A non-transitory machine-readable storage medium storing instructions that cause a processing device to:

generate a block list comprising a plurality of list items, wherein each list item identifies a respective block of a source virtual machine image corresponding to a state of a first virtual machine with an application, and the list items are ordered in the block list according to a timestamp of each respective block, wherein the timestamp indicates a time of a last access of the respective block;

delete a list item from the block list based on a length of the block list exceeding a limit;

send the block list to a destination computing device;

send, to the destination computing device, a first block as referenced by a first list item;

delete the first list item from the block list;

empty the block list;

receive, from the destination computing device, one or more candidate blocks;

determine whether the one or more candidate blocks are included in the source virtual machine image by identifying the one or more matching blocks, wherein the one or more matching blocks include each of the candidate blocks that matches a respective block of the source virtual machine image;

send, to the destination computing device, a result indicating one or more matching blocks among the one or more candidate blocks that are included in the source virtual machine image;

send, to the destination computing device, the source virtual machine image excluding the one or more matching blocks; and cause the first virtual machine to migrate from the source computing device to the destination computing device such that a second virtual machine starts to execute on the destination computing device using the state of the first virtual machine.

* * * * *